United States Patent
Zahavi et al.

(10) Patent No.: US 11,909,710 B2
(45) Date of Patent: Feb. 20, 2024

(54) UNIQUE ADDRESS ASSIGNMENT WITHOUT RECONFIGURATION

(71) Applicant: MELLANOX TECHNOLOGIES, LTD., Yokneam (IL)

(72) Inventors: Eitan Zahavi, Zichron Yaakov (IL); Guy Rozenberg, Rehovot (IL); Matty Kadosh, Hedera (IL); Lion Levi, Yavne (IL); Boris Pismenny, Haifa (IL); Alex Netes, Rehovot (IL); Miriam Menes, Tel Aviv (IL); Lior Hodaya Bezen, Jerusalem (IL); Michael Tahar, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/859,022

(22) Filed: Jul. 7, 2022

(65) Prior Publication Data
US 2024/0015130 A1     Jan. 11, 2024

(51) Int. Cl.
*H04L 61/106* (2022.01)
*H04L 61/5061* (2022.01)
*H04L 61/5092* (2022.01)

(52) U.S. Cl.
CPC ........ *H04L 61/106* (2013.01); *H04L 61/5061* (2022.05); *H04L 61/5092* (2022.05)

(58) Field of Classification Search
None
See application file for complete search history.

(56) References Cited

U.S. PATENT DOCUMENTS

| | | | |
|---|---|---|---|
| 8,280,716 B2 | 10/2012 | Haviv et al. | |
| 9,729,440 B2 | 8/2017 | Itkin | |

(Continued)

FOREIGN PATENT DOCUMENTS

| | | | |
|---|---|---|---|
| CN | 102307249 B | * | 1/2014 |
| KR | 101690787 B1 | * | 12/2016 |

OTHER PUBLICATIONS

Thomson et al., "IPv6 Stateless Address Autoconfiguration," RFC 2462, Network Working Group, The Internet Society, pp. 1-25, Dec. 1998.

(Continued)

*Primary Examiner* — Younes Naji
(74) *Attorney, Agent, or Firm* — Kligler & Associates Patent Attorneys Ltd.

(57) ABSTRACT

A method for communication includes provisioning each node in a network with a respective set of two or more network addresses. Each node in succession is assigned a respective network address from the respective provisioned set that has not been assigned for use by any preceding node. Upon finding for a given node that all the network addresses in the respective provisioned set were assigned to preceding nodes, the preceding nodes are searched to identify a candidate node having an additional network address in the respective provisioned set, other than the assigned respective network address, that was not yet assigned to any of the nodes. The additional network address is assigned to the candidate node instead of the respective network address that was previously assigned to the candidate node, and the assigning of the network addresses to the nodes in the succession resumes following the candidate node.

19 Claims, 3 Drawing Sheets

(56) References Cited

U.S. PATENT DOCUMENTS

| | | | |
|---|---|---|---|
| 9,985,820 B2 | 5/2018 | Itkin | |
| 10,831,692 B2 * | 11/2020 | Van Der Zande | H04L 61/5038 |
| 2003/0097438 A1 * | 5/2003 | Bearden | H04M 3/2236 |
| | | | 709/224 |
| 2016/0234077 A1 | 8/2016 | Rottenstreich et al. | |
| 2017/0264663 A1 * | 9/2017 | Bicket | H04L 49/25 |
| 2021/0194825 A1 * | 6/2021 | Goodman | G06F 16/29 |

OTHER PUBLICATIONS

Thomson et al., "IPv6 Stateless Address Autoconfiguration," RFC 4862, Network Working Group, The IETF Trust, pp. 1-30, Sep. 2007.

\* cited by examiner

UNIQUE ADDRESS ASSIGNMENT WITHOUT RECONFIGURATION

FIELD OF THE INVENTION

The present invention relates generally to communication networks, and particularly to methods and systems for assigning addresses in a communication network.

BACKGROUND

Most packet communication networks use Internet Protocol (IP) addresses to identify the source and destination of each data packet. Within a given network, IP addresses must generally be unique, i.e., each network interface of any given node in the network must have its own IP address, which cannot be shared with any other network interface in the same network. (Network Address Translation allows IP addresses to be reused in different networks.) The Dynamic Host Configuration Protocol (DHCP) is commonly used for automatically assigning IP addresses: When connected to the network, and periodically thereafter, clients request and receive IP addresses from a DHCP server, which ensures that all addresses are unique. Alternatively, unique IP addresses may be assigned manually when network nodes are set up and initialized.

Both DHCP and manual configuration of IP addresses can cause bottlenecks in large networks, particularly when many nodes are brought on line concurrently. As an alternative, Thomson et al. describe a mechanism for "IPv6 Stateless Address Autoconfiguration" in Request for Comments (RFC) 4862 of the Internet Engineering Task Force (IETF) (September 2007). This document specifies the steps a host takes in deciding how to autoconfigure its interfaces in IP version 6. The autoconfiguration process includes a Duplicate Address Detection procedure to verify the uniqueness of the addresses on a link.

SUMMARY

Embodiments of the present invention that are described hereinbelow provide improved methods for automatic assignment of network addresses, as well as systems and software implementing such methods.

There is therefore provided, in accordance with an embodiment of the invention, a method for communication, which includes, in a network including multiple nodes, provisioning each node with a respective set of two or more network addresses. A respective network address is assigned to each node in succession, selected from the respective provisioned set, that has not been assigned for use by any preceding node in the succession. Upon finding for a given node that all the network addresses in the respective provisioned set were assigned to preceding nodes in the succession, a search is conducted over the preceding nodes to identify a candidate node having an additional network address in the respective provisioned set, other than the assigned respective network address, such that the additional network address was not yet assigned to any of the nodes. The additional network address is assigned to the candidate node instead of the respective network address that was previously assigned to the candidate node. The assigning of the network addresses to the nodes in the succession resumes following the candidate node.

In the disclosed embodiments, resuming the assigning includes assigning respective unique network addresses to all the nodes in the network. In one embodiment, assigning the respective unique network addresses includes, upon encountering another node, following the given node in the succession, for which all the network addresses in the respective provisioned set were assigned to the preceding nodes in the succession, repeating the steps of searching to identify a further candidate node and assigning another additional network address to the further candidate node before again resuming the assigning. Additionally or alternatively, assigning the respective unique network addresses includes assigning all the network addresses automatically, without intervention by a human operator.

Typically, the method includes communicating among the multiple nodes over the network using the assigned respective network addresses.

In some embodiments, searching over the preceding nodes includes performing a breadth-first search over the preceding nodes in the succession beginning from the given node until the candidate node is identified. In a disclosed embodiment, resuming the assigning of the network addresses includes assigning the network addresses while traversing the nodes in a reverse order of the breadth-first search.

In one embodiment, each node has a respective device identifier, and provisioning each node includes applying two or more hash functions to the respective device identifier to generate the two or more network addresses.

In a disclosed embodiment, the network addresses are Internet Protocol version 4 (IPv4) addresses.

There is also provided, in accordance with an embodiment of the invention, a system for communication, including multiple nodes connected to a network, wherein each node is provisioned with a respective set of two or more network addresses. One or more programmable processors are configured to run a network manager process, which assigns to each node in succession a respective network address, selected from the respective provisioned set, that has not been assigned for use by any preceding node in the succession and upon finding for a given node that all the network addresses in the respective provisioned set were assigned to preceding nodes in the succession, searches over the preceding nodes to identify a candidate node having an additional network address in the respective provisioned set, other than the assigned respective network address, such that the additional network address was not yet assigned to any of the nodes, and assigns the additional network address to the candidate node instead of the respective network address that was previously assigned to the candidate node, and resumes assigning of the network addresses to the nodes in the succession following the candidate node.

There is additionally provided, in accordance with an embodiment of the invention, a computer software product for use in a network to which multiple nodes are connected, wherein each node is provisioned with a respective set of two or more network addresses. The product includes a tangible, non-transitory computer-readable medium in which program instructions are stored. The instructions, when read by one or more processors, cause the one or more processors to run a network manager process, which assigns to each node in succession a respective network address, selected from the respective provisioned set, that has not been assigned for use by any preceding node in the succession and upon finding for a given node that all the network addresses in the respective provisioned set were assigned to preceding nodes in the succession, searches over the preceding nodes to identify a candidate node having an additional network address in the respective provisioned set, other than the assigned respective network address, such that the additional network address was not yet assigned to any of the nodes, and assigns the additional network address to the candidate node instead of the respective network address that was previously assigned to the candidate node, and resumes assigning of the network addresses to the nodes in the succession following the candidate node.

The present invention will be more fully understood from the following detailed description of the embodiments thereof, taken together with the drawings in which:

DETAILED DESCRIPTION OF EMBODIMENTS

Figure 1:
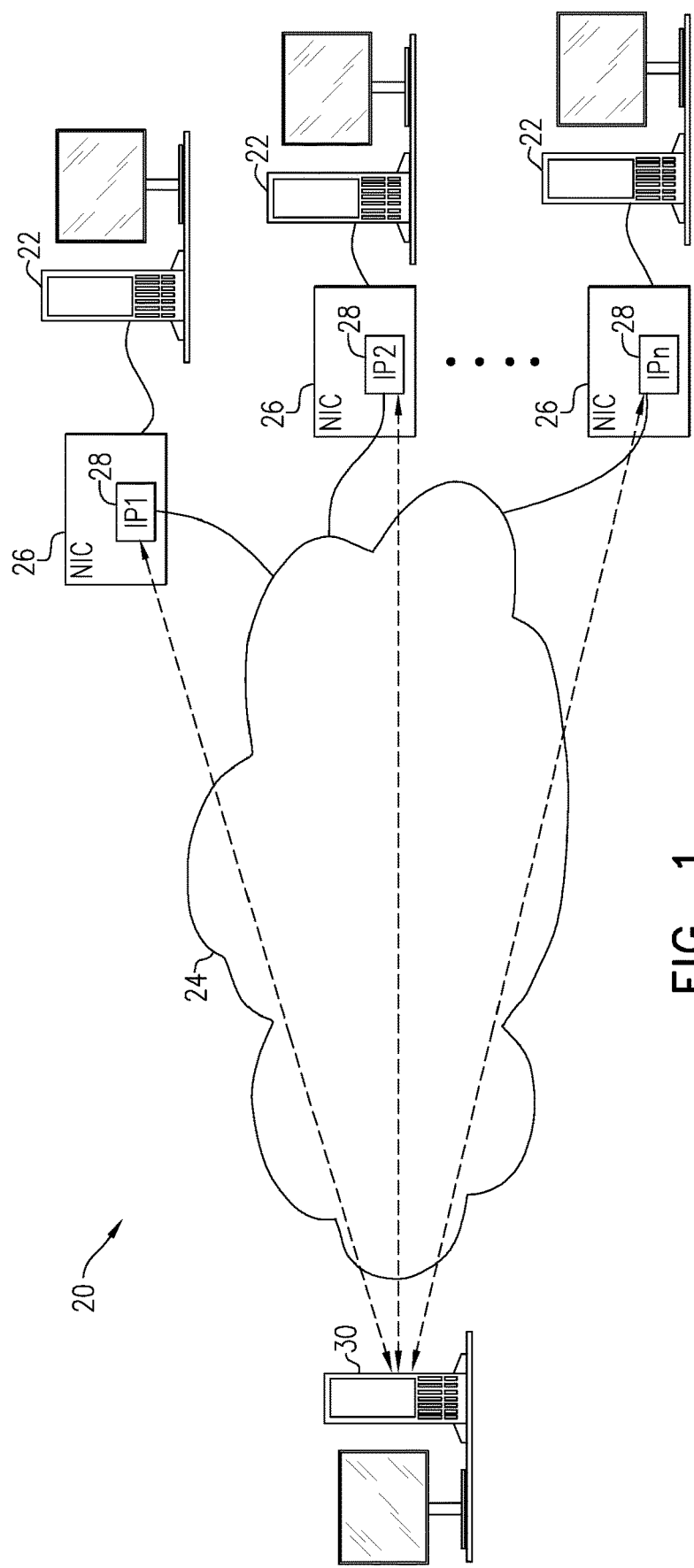
FIG. 1 is a block diagram of a computer network in which network addresses are assigned automatically in accordance with an embodiment of the invention.

Large networks, such as data center networks, can include many thousands of network interfaces. Each network interface must be assigned its own, unique IP address. Manual assignment of IP addresses on this scale is not practical. DHCP can be used for intermittent assignment of new IP addresses, but it becomes a bottleneck when the server must handle many concurrent client requests, such as upon network startup or reconfiguration. Furthermore, DHCP address assignments are necessarily transmitted over connections that are not secure, because IP-based security protocols cannot be applied until the client has received its IP address from the DHCP server. The autoconfiguration process defined in the above-mentioned RFC 4862 can help in streamlining address assignment (in networks using IPv6), but offers no solution other than manual reconfiguration when an address is found not to be unique.

Embodiments of the present invention that are described herein provide an alternative technique for assignment of unique network addresses, such as IP addresses, that is efficient, secure, and fully automated. To facilitate choosing unique addresses for all nodes in the network, each node is initially provisioned with a set of two or more network addresses, from among which the unique address will be assigned. The addresses may be provisioned in a quasi-random process, for example by applying two or more different, known hash functions to a unique device identifier that is assigned to each network interface by its manufacturer. (These identifiers are generally more than thirty-two bits long and are therefore unsuitable for use themselves as Internet Protocol version 4 [IPv4] addresses.) Each node in succession is then assigned a respective network address by choosing an address from the provisioned set of the node that has not yet been assigned for use by any preceding node in the succession.

When multiple addresses are provisioned to each node in this manner, the probability that one of the addresses will be unique is high; and it will only occasionally occur that all the network addresses in the provisioned set of a given node are found to have been assigned to preceding nodes in the succession of address assignments. To resolve such "collisions" when they do occur, a search is carried out over the preceding nodes in the succession to find a candidate node having an unused network address in its provisioned set, i.e., an additional network address, other than the address that was already assigned to the candidate node, that was not yet assigned to any of the nodes in the succession. A breadth-first search (BFS) is an efficient strategy for this sort of search, since it minimizes the number of address replacements that will be needed to reach a unique assignment. The unused network address of the candidate node is assigned to the candidate node instead of its previously assigned address, and the assignment of network addresses to the nodes resumes in succession following the candidate node. This succession may typically traverse the same nodes that were traversed in the search, but in reverse order, until it reaches the node from which the search started.

After the collision has been resolved, the process of address assignment continues until all the nodes in the network have been assigned unique addresses from their own provisioned sets. Further searches are carried out as necessary if and when further collisions occur. The entire process can be carried out automatically, without intervention by a human operator. Furthermore, because all the network addresses are provisioned in advance, the network is secure against unauthorized address assignment.

FIG. 1 is a block diagram of a computer system 20, in which IP addresses on a packet communication network 24 are assigned automatically in accordance with an embodiment of the invention. System 20 comprises multiple computing nodes 22, each of which is connected to network 24 by a respective network interface controller (NIC) 26. Although FIG. 1 shows only a few nodes 22, in the form of computers, in practice system 20 may comprise many thousands or tens of thousands of nodes, including computers, switches, storage devices, and other sorts of appliances, all connected to network 24.

Each NIC 26 is assigned an IP address 28, which is selected from a set of two or more IP addresses that are provisioned in the NIC. (When a given NIC has multiple ports, each port is assigned a different, unique IP address.) An automated network manager 30 supervises the process of IP address assignment, as described below, so as to ensure that each node 22 has an IP address that is unique in network 24 and to resolve collisions when they occur. Network manager 30 is typically implemented in a software process, which may run on one or more programmable processors on a single network node, as shown in FIG. 1, or may run as a distributed process on multiple nodes in system 20. The software program instructions that are used in this process may be stored on tangible, non-transitory computer-readable media, such as optical, magnetic, or electronic memory media.

Figure 2:
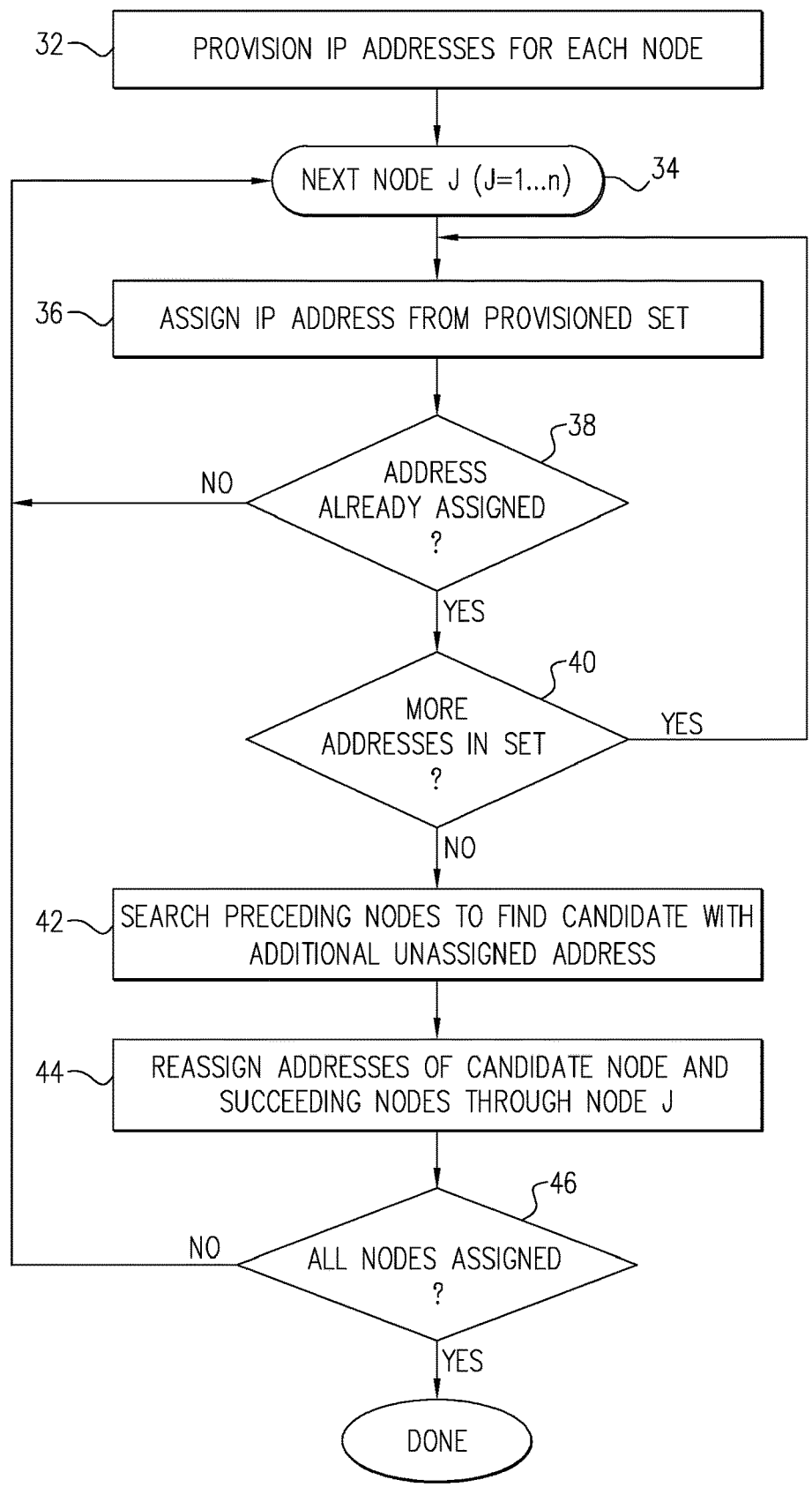
FIG. 2 is a flow chart, which schematically illustrates a method for automatic assignment of network addresses, in accordance with an embodiment of the invention.

FIG. 2 is a flow chart, which schematically illustrates a method for automatic assignment of IP addresses, in accordance with an embodiment of the invention. The method is described with reference to system 20 (FIG. 1) by way of example, for the sake of convenience and clarity; but it may alternatively be implemented in other, more complex network topologies, as well as in networks operating in accordance with other protocols.

As a preliminary step in this method, each NIC 26 is provisioned with a respective set of two or more IP addresses, at a provisioning step 32. As noted earlier, in one embodiment, each NIC 26 has a unique device identifier that is assigned by the manufacturer, such as a sixty-four bit globally unique ID (GUID). In step 32, each node 22 computes two or more possible IPv4 addresses, which are thirty-two bits long, by applying well-known hash functions to the GUID. Alternatively, the possible IP addresses may be stored in advance in a memory of NIC 26, such as a one-time programmable (OTP) memory, or distributed to the NIC by other secure means.

The process of IP address assignment traverses nodes 22 in succession, in an iterative process from node J=1 through node J=n, at a network traversal step 34. During this process, manager 30 maintains and updates a record of the IP addresses that have been assigned. In each iteration, the current node J selects one of the IP addresses in its provisioned set for assignment as its unique IP address, at an address selection step 36. Manager 30 checks whether the selected address has already been assigned to another node, at an assignment checking step 38. If not, the selected address is assigned to NIC 26 of node J, and the method proceeds to the next node in the succession, node J+1.

If the selected address has already been assigned to an earlier node in the succession, manager 30 checks whether NIC 26 of node J has any other addresses in its provisioned set that were not yet assigned, at a further address check step 40. If so, a further address is selected from the provisioned step at step 36, and manager 30 repeats the assignment check of step 38. If this further address is found to be unassigned, it is assigned to NIC 26 of node J, and the method proceeds to node J+1.

If the provisioned set of NIC 26 of node J is found at step 40 to have been exhausted, meaning that all the IP addresses in the provisioned set were already assigned to preceding nodes, manager 30 initiates a search over the preceding nodes to identify a candidate node having an additional, unassigned IP address, at a search step 42. This search may take the form of a breath-first search (BFS), for example as illustrated below in FIG. 3A. (Details of implementation of this search, as well as the subsequent process of address reassignment, are described hereinbelow with reference to FIGS. 3A/B and are set forth formally in a pseudocode listing.) The search proceeds backward through the succession of nodes to which IP addresses were previously assigned until it finds a candidate node having an additional IP address in its provisioned set that was not yet assigned to any of the nodes. Manager 30 assigns this additional IP address to the candidate node instead of the IP address that was previously assigned to the candidate node, at an address reassignment step 44. Manager 30 then reassigns the IP addresses of the nodes that followed the candidate node in the original succession, traversing these nodes in the reverse order of the BFS that found the candidate node.

When the process of reassignment reaches node J, from which the search initiated at step 42, one of the IP addresses in the provisioned set of node J will have become available due to the reassignment of addresses of the preceding nodes. Manager 30 assigns this IP address to NIC 26 of node J.

Following each iteration, manager 30 checks whether all nodes 22 in system 20 have received IP addresses, at a completion checking step 46. If not, the method returns to step 36 for the next iteration. When necessary, the search and reassignment procedures of steps 42 and 44 are repeated. Once all nodes have finally been traversed, each NIC 26 will have been assigned its own, respective unique IP address. Nodes 22 may then communicate freely and securely over network 24 using the assigned IP addresses, without the need for a human operator to have been involved in the assignments.

Figure 3A:
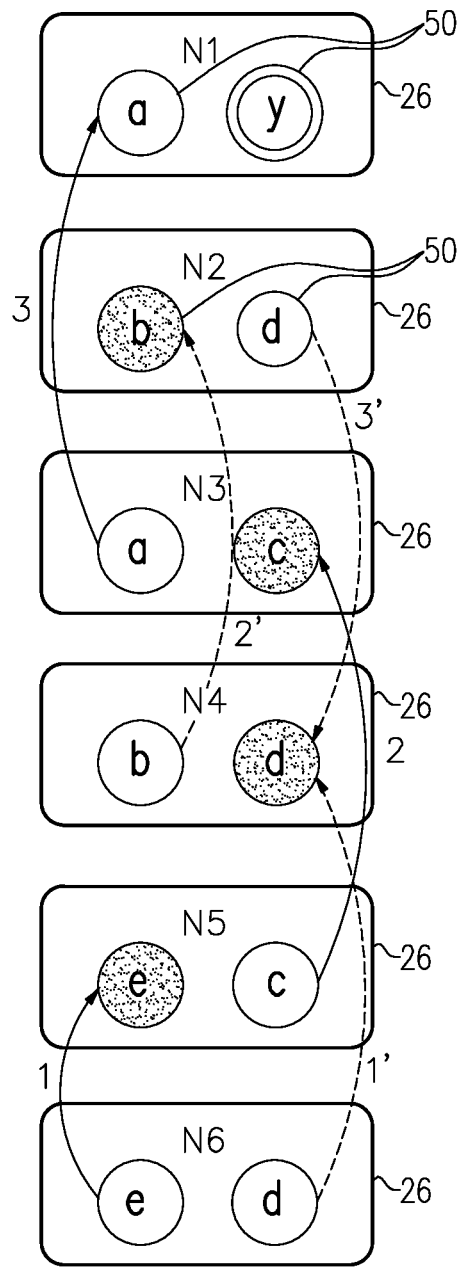
FIGS. 3A and 3B are block diagrams that schematically show an example of an application of the method of FIG. 2, in accordance with an embodiment of the invention.
Figure 3B:
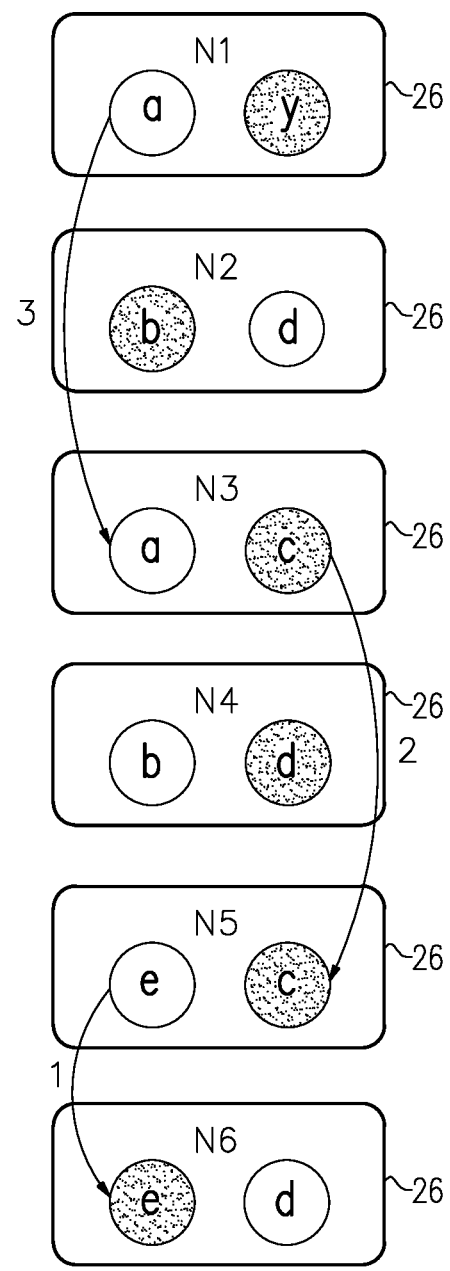

FIGS. 3A and 3B are block diagrams that schematically show an example of application of the method of FIG. 2, in accordance with an embodiment of the invention. FIG. 3A illustrates the sort of BFS that is carried out at step 42, while FIG. 3B illustrates the reassignment of IP addresses at step 44. These figures show a segment of the succession of nodes in the assignment process, from node N1 through node N6. Each node is provisioned with a respective set of two IP addresses 50, represented by the letters a-e and y. The IP address 50 that is assigned to each node is indicated by shading.

Beginning from FIG. 3A, as nodes N1 through N5 are traversed in the loop of steps 36-40 (FIG. 2), each node can be assigned one of its two provisioned IP addresses (a, b, c, d, e), because one of the addresses in each node is free. When the succession reaches the last node N6, however, manager 30 finds that both the IP addresses in its provisioned set (d and e) have already been assigned.

Manager 30 therefore initiates a BFS, searching backward from N6. The first hops of the search (marked 1 and 1') reach nodes N5 and N4 because they are the "owners" of addresses e and d respectively. These nodes have additional provisioned IP addresses c and d respectively, but these IP addresses have already been assigned to nodes N3 and N2. Thus, the second hops of the search (2 and 2') reach nodes N3 and N2. Yet again, the additional provisioned IP addresses of these nodes, a and d, have already been assigned. (Address d is found to have been assigned to node N4, which was already traversed in the BFS, as indicated by hop 3', so that this address cannot be reassigned.) In hop 3, however, the search reaches the candidate node N1, having the additional IP address y, which has not yet been assigned to any of the nodes.

Turning now to FIG. 3B, manager 30 assigns IP address y to node N1, thus freeing address a. By reversal of hops 3 and 2, nodes N3 and N5 are now assigned IP addresses a and c, respectively. The reassignment at node N5 frees IP address e for assignment to node N6. The normal process of address assignment then resumes following node N6.

The method described above for assignment of unique IP addresses is represented formally by the following pseudocode listing (in which IP addresses are referred to simply as "IPs" for the sake of brevity):

Given: N IPs for each of K nodes: IP(node index 1 to R, hash index 1 to N),

Find: a unique assignment, across all nodes, UniqIP(node index 1 to R) by selecting one of the IP(node index, hash index) for each node. To ensure that an assignment is unique, we track the IP assignments in a dictionary A(IP)=node index holding that IP.

FIND_UNIQ_IP( )
    Initialize UniqIP as an array of size R that will eventually hold the IP assignment of each node by its index.
    Initialize A as an empty dictionary to look up the index of the node by its assigned IP.
    Initialize V as an array of size R, and fill with zeros, to track visited nodes by current BFS.
    For each node index J in 1 to R
        If any W of its N IPs is not already assigned to another node and thus does not exist in A(W)
            A(W)=J
            UniqIP(J)=W
        Else
            BFS_FIND_FREE_IP(J)

We use a BFS Queue (BQ in short) to keep a record of the next nodes to visit. Each BQ entry holds the index I of a node that is considered for IP address reassignment and the list L of previous BFS steps leading to it. Each element in L holds the index of the node and the IP address that led to it: LeadIP. To avoid loops, we track the nodes visited in the search in an array V, with an entry for each node. If V(I)==J, it means that node I was already visited in assigning the IP address of node J. V is initiated to contain all zeros.

```
BFS_FIND_FREE_IP (for node index J)
    Init the BFS Queue with a single entry = (J, empty-
        list)
1058-2204S3
    Mark J as visited V (J) =J
    While there are entries in BQ pop the head, setting I
        and L to the node index and the list of the previous
        step
        For each W = IP of the index N assigned to I
            If A(W) is not set i.e., it is not previously used
                A(W) = I
                UniqIP(I) = W
                / /We now replace the assigned addresses for all
                the visited nodes by this path in the BFS:
                For each path element E in L we define E.Q =
                the path element node index and E.LeadIP = the
                IP that led to it
                    A(E.LeadIP) = E.Q
                    UniqIP(E.Q) = E.LeadIP
                Return
            // at this point we could not find a replacement IP
            so we need to recurse
            For each W = IP of the N assigned to I
                K = A(W) // we know it exists since previous loop
                failed
                If V(K) != J // is not visited
                    V(K) = J // mark as visited
                    M = L, {I, W} // add the pair I, W as the last
                        member of L into a new list M
                    Add to the BQ an entry of {K, M}
```

Although the embodiments described above relate specifically to assignment of unique IP addresses, the techniques used in these embodiments may alternatively be applied in assignment of network addresses of other types, for use in accordance with other communication protocols. Furthermore, the principles of the present invention may be applied not only in assignment of network addresses, but also, mutatis mutandis, in resolving collisions that may occur in other contexts, such as cuckoo hashing.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
in a network comprising multiple nodes, provisioning each node with a respective set of two or more network addresses;
assigning to each node in succession a respective network address, selected from the respective provisioned set, that has not been assigned for use by any preceding node in the succession;
upon finding for a given node that all the network addresses in the respective provisioned set were assigned to preceding nodes in the succession, searching over the preceding nodes to identify a candidate node having an additional network address in the respective provisioned set, other than the assigned respective network address, wherein the additional network address is not yet assigned to any of the multiple nodes, and wherein searching over the preceding nodes comprises performing a search over the preceding nodes in the succession beginning from the given node until the candidate node is identified;
freeing the respective network address that was previously assigned to the candidate node for assignment to another node and assigning the additional network address to the candidate node; and
resuming the assigning of the respective network address to each of the multiple nodes in the succession following the candidate node.

2. The method according to claim 1, wherein resuming the assigning comprises assigning respective unique network addresses to all the multiple nodes in the network.

3. The method according to claim 2, wherein assigning the respective unique network addresses comprises, upon encountering another node, following the given node in the succession, for which all the network addresses in the respective provisioned set were assigned to the preceding nodes in the succession, repeating the steps of searching to identify a further candidate node and assigning another additional network address to the further candidate node before again resuming the assigning of the respective network address to each of the multiple nodes.

4. The method according to claim 2, wherein assigning the respective unique network addresses comprises assigning all the respective unique network addresses automatically, without intervention by a human operator.

5. The method according to claim 1, and comprising communicating among the multiple nodes over the network using the assigned respective network addresses.

6. The method according to claim 1, wherein performing the search over the preceding nodes comprises performing a breadth-first search over the preceding nodes.

7. The method according to claim 6, wherein resuming the assigning of the respective network address to each of the multiple nodes comprises assigning the respective network address to each of the multiple nodes while traversing the multiple nodes in a reverse order of the breadth-first search.

8. The method according to claim 1, wherein each node of the multiple nodes has a respective device identifier, and wherein provisioning each node comprises applying two or more hash functions to the respective device identifier to generate the two or more network addresses.

9. The method according to claim 1, wherein the assigned respective network addresses are Internet Protocol version 4 (IPv4) addresses.

10. A system for communication, comprising:
multiple nodes connected to a network, wherein each node is provisioned with a respective set of two or more network addresses; and
one or more programmable processors, configured to run a network manager process, the network manager process is configured to:
assign to each node in succession a respective network address, selected from the respective provisioned set, that has not been assigned for use by any preceding node in the succession;
upon finding for a given node that all the network addresses in the respective provisioned set were assigned to preceding nodes in the succession, search over the preceding nodes to identify a candidate node having an additional network address in the respective provisioned set, other than the assigned respective network address, wherein the additional network address is not yet assigned to any of the multiple nodes, and wherein searching over the preceding nodes comprises performing a search over the preceding nodes in the succession beginning from the given node until the candidate node is identified;

free the respective network address that was previously assigned to the candidate node for assignment to another node and assign the additional network address to the candidate node; and resume the assigning of the respective network address to each of the multiple nodes in the succession following the candidate node.

11. The system according to claim 10, wherein the network manager process is configured to assign respective unique network addresses to all the multiple nodes in the network.

12. The system according to claim 11, wherein the network manager process is configured, upon encountering another node, following the given node in the succession, for which all the network addresses in the respective provisioned set were assigned to the preceding nodes in the succession, to repeat the steps of searching to identify a further candidate node and assigning another additional network address to the further candidate node before again resuming the assigning of the respective network address to each of the multiple nodes.

13. The system according to claim 11, wherein the network manager process is configured to assign all the respective unique network addresses automatically, without intervention by a human operator.

14. The system according to claim 10, wherein the multiple nodes are configured to communicate over the network using the assigned respective network addresses.

15. The system according to claim 10, wherein performing the search over the preceding nodes comprises performing a breadth-first search over the preceding nodes.

16. The system according to claim 15, wherein the network manager is configured to resume the assigning of the respective network address to each of the multiple nodes by assigning the respective network address to each of the multiple nodes traversing the multiple nodes in a reverse order of the breadth-first search.

17. The system according to claim 10, wherein each node of the multiple nodes has a respective device identifier, and wherein each node is provisioned by applying two or more hash functions to the respective device identifier to generate the two or more network addresses.

18. The system according to claim 10, wherein the assigned respective network addresses are Internet Protocol version 4 (IPv4) addresses.

19. A computer software product for use in a network to which multiple nodes are connected, wherein each node is provisioned with a respective set of two or more network addresses, the product comprising:

a tangible, non-transitory computer-readable medium in which program instructions are stored, which instructions, when read by one or more processors, cause the one or more processors to run a network manager process, the network manager process comprising:

assigning to each node in succession a respective network address, selected from the respective provisioned set, that has not been assigned for use by any preceding node in the succession;

upon finding for a given node that all the network addresses in the respective provisioned set were assigned to preceding nodes in the succession, searching over the preceding nodes to identify a candidate node having an additional network address in the respective provisioned set, other than the assigned respective network address, wherein the additional network address is not yet assigned to any of the multiple nodes, and wherein searching over the preceding nodes comprises performing a search over the preceding nodes in the succession beginning from the given node until the candidate node is identified;

freeing the respective network address that was previously assigned to the candidate node for assignment to another node, and assigning the additional network address to the candidate node; and resuming the assigning of the respective network address to each of the multiple nodes in the succession following the candidate node.

* * * * *